United States Patent [19]

Shyu

[11] Patent Number: 5,203,178
[45] Date of Patent: Apr. 20, 1993

[54] NOISE CONTROL OF AIR CONDITIONER

[75] Inventor: Jia-Ming Shyu, Hsinchu, Taiwan

[73] Assignee: Norm Pacific Automation Corp., Hsinchu, Taiwan

[21] Appl. No.: 696,506

[22] Filed: May 7, 1991

Related U.S. Application Data

[63] Continuation-in-part of Ser. No. 605,419, Oct. 30, 1990, abandoned.

[51] Int. Cl.$^5$ .......................... F25D 17/00; F04B 49/00
[52] U.S. Cl. ...................................... 62/180; 62/228.4; 62/296; 417/14
[58] Field of Search ........................ 62/228.4, 296, 180; 417/14; 318/66–68; 181/403

[56] References Cited

U.S. PATENT DOCUMENTS

| 4,856,286 | 8/1989 | Sulfsteve et al. | 62/180 X |
| 5,010,739 | 4/1991 | Isshiki et al. | 62/158 |

FOREIGN PATENT DOCUMENTS

| 0062348 | 4/1982 | Japan | 62/180 |
| 0272483 | 5/1985 | Japan | 62/296 |
| 0261683 | 11/1987 | Japan | 62/296 |

Primary Examiner—William E. Wayner
Attorney, Agent, or Firm—Spencer, Frank & Schneider

[57] ABSTRACT

An air conditioning apparatus having a condenser fan, an evaporator fan, a compressor, at least two motor for driving the fans and the compressor, and being responsive to vibration of the apparatus to control the speed of each motor to reduce the vibration. In its preferred embodiments, the apparatus performs a test to determine optimum speeds of the motors to minimize the vibration. The apparatus uses a microcomputer, operative during the test to change the speed of at least one of the motors to each of a plurality of different speed values within a predetermined speed range, and at least one vibration detector. The detector detects values of the vibration when the motors are operating at the different speed values. At the end of the test, the motors are controlled to operate at the speed value at which the vibration is minimized.

12 Claims, 3 Drawing Sheets

NOISE CONTROL OF AIR CONDITIONER

This is a continuation-in-part of application Ser. No. 07/605,419, filed Oct. 30, 1990 not abandoned.

BACKGROUND OF THE INVENTION

This invention relates to an air conditioner where the motors therein can automatically adjust and self-test their rotational speed under all operation requirements to reduce vibration and noise generated while operating.

The vibration of an air conditioner is usually generated when the motors are rotating and cause resonance with the installed environments. The generated noise often makes people feel uncomfortable and sometimes can even cause injury to people's health. The fan of the condenser of a conventional air conditioner shares a motor with the fan of the evaporator; that is, the rotational speed is maintained constant all of the time (or an alternates between high or low rotational speeds only). The rotational speed of the compressor is constant as well. As a result, no matter how smoothly and quietly the machine itself is designed to rotate, it still causes vibration and noise when installed in a different environment where the resonance is generated due to the natural resonant frequency of the air conditioner in its interaction with the environment. Lately, motors with adjustable rotating speed are widely used; however, the natural frequency between an air conditioner and the environment of its installation is not known for sure. The rotational speed will hit a resonant frequency quite often. It generates vibration and noise which causes a negative effect on the life and noise of the air conditioner. Up to now, there has been no solution to the problem.

SUMMARY OF THE INVENTION

This invention, to solve the problems mentioned above, provides an air conditioning machine or apparatus, for example an air conditioner, wherein the respective rotational speed of the motors can be modulated to eliminate vibration and noise.

As the air conditioner is as work, to avoid unnecessary noise caused by vibration and noise during testing and adjusting different motor rotational speed, this invention provides an air conditioner function of self-testing of the motor rotational speed wherein the optimum testing time is while no one is in a vicinity of the air conditioner.

In this invention, the condenser fan, the evaporator fan and the compressor of an air conditioner have their respective motors. With sensors sensing vibration and noise (vibration which includes vibration in the audible range), and a microcomputer monitoring the sensed value, an abnormal vibration condition can be detected. The microcomputer will then modulate the rotational speed of one or more than one of the motors (in a preset sequence) within a suitable range, to reduce vibration. The modulation can be performed when the air conditioner is at work by repeating the above mentioned procedure of sensing and modulating till an optimum combination of rotational speed among the motors that produces minimum vibration and noise is obtained. Alternatively, the noise test of each motor can be automatically operated while nobody is in a vicinity of the air conditioner, whereby and the noise values of all rotational speed combinations are recorded in memory, which enables the air conditioner, while at work, to directly fetch the optimum rotation control values.

BRIEF DESCRIPTION OF THE DRAWINGS

The composition and function of this invention will be described in detail with reference to the appended figures, in which.

DETAILED DESCRIPTION OF PREFERRED EMBODIMENTS

Figure 1:
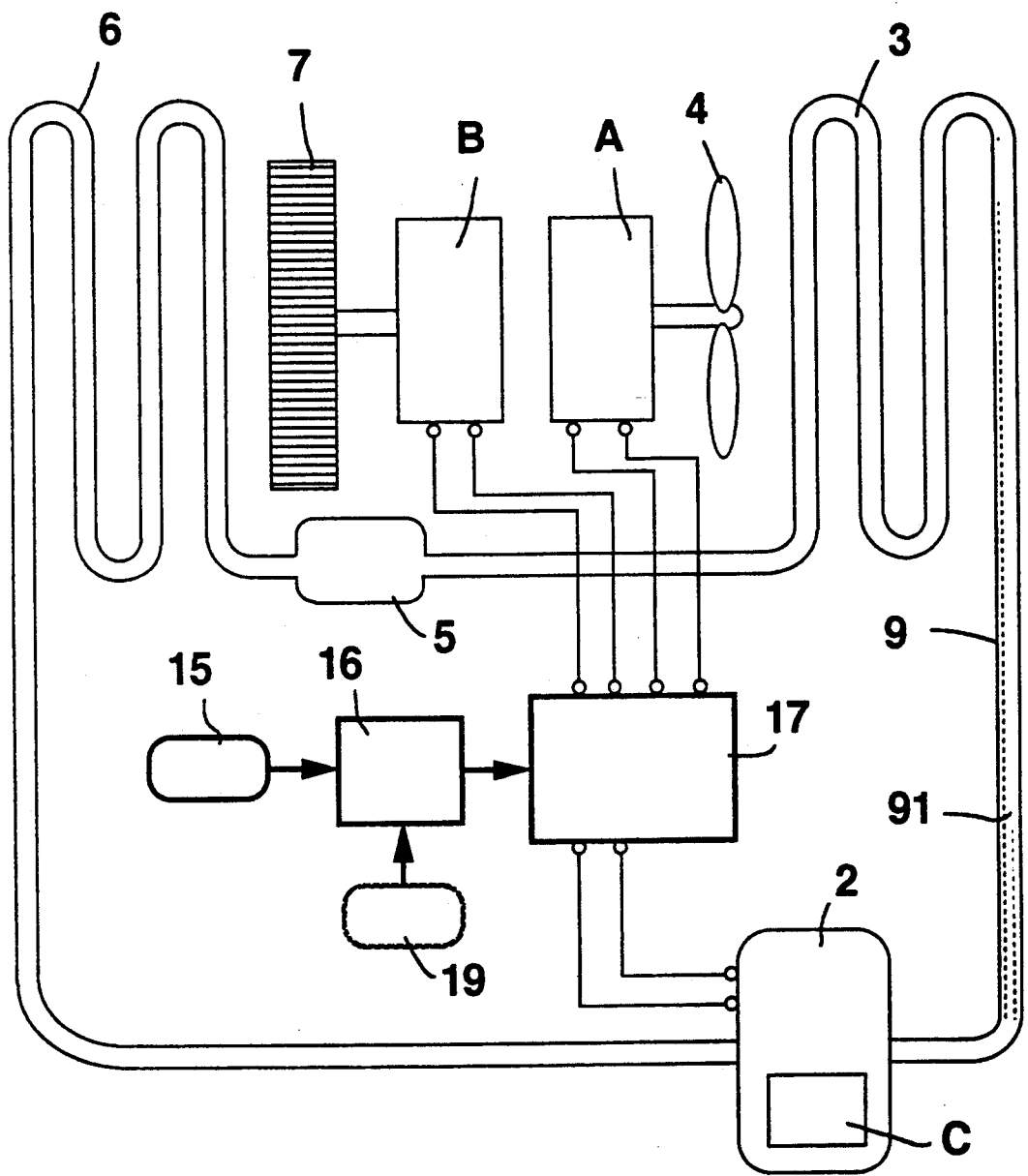
FIG. 1 is a block diagram illustrating an embodiment of this invention.

As shown in FIG. 1, an air conditioner of this invention comprises a general structure: a compressor 2, a condenser 3, an evaporation control device 5 (capillary tube or expansion valve), an evaporator 6, a fan 4 and a fan 7 which control the heat-exchange efficiency of condenser 3 and evaporator 6 respectively, and refrigerant 91 that circulates in the tube 9. The fan 4 of the condenser, the fan 7 of the evaporator and the compressor 2 are actuated by motor A, B, and C respectively. This invention sets up at least one vibration/noise detector 15, such as a microphone, in a proper position of the air conditioner for detecting vibration and noise of the machine in the environment of its installation. The detected signals, after being amplified and converted, are sent to a microcomputer 16 for storage in memory, identification of an abnormality and generation of control signals through a controller 17. The control signals are to modulate the rotational speed of at least one of the motors, till the detector 15 detects that the vibration and noise have already reached the required level. To modulate the rotational speed, we can use elements from the prior art such as a frequency converter or a clipper circuit or a direct-current voltage control which will not be described in detail here. The modulation of rotational speed of each motor can be self-tested while the air conditioner is at work. Or it can be operated automatically through a preset procedure with testing and recordation of noise while nobody is in the vicinity of the air conditioner, e.g. in a room and when the air conditioner is in use, optimum speed control values for the motors can be obtained directly. For this function, there is a human body detector 19 (such as an infrared sensor) to detect if there is a person in the room and then output the corresponding signals to the microcomputer 16 as a controlling base. These two embodiments showing the operation of the microcomputer 16 will be further described with reference to FIG. 2 and FIG. 3.

Figure 2:
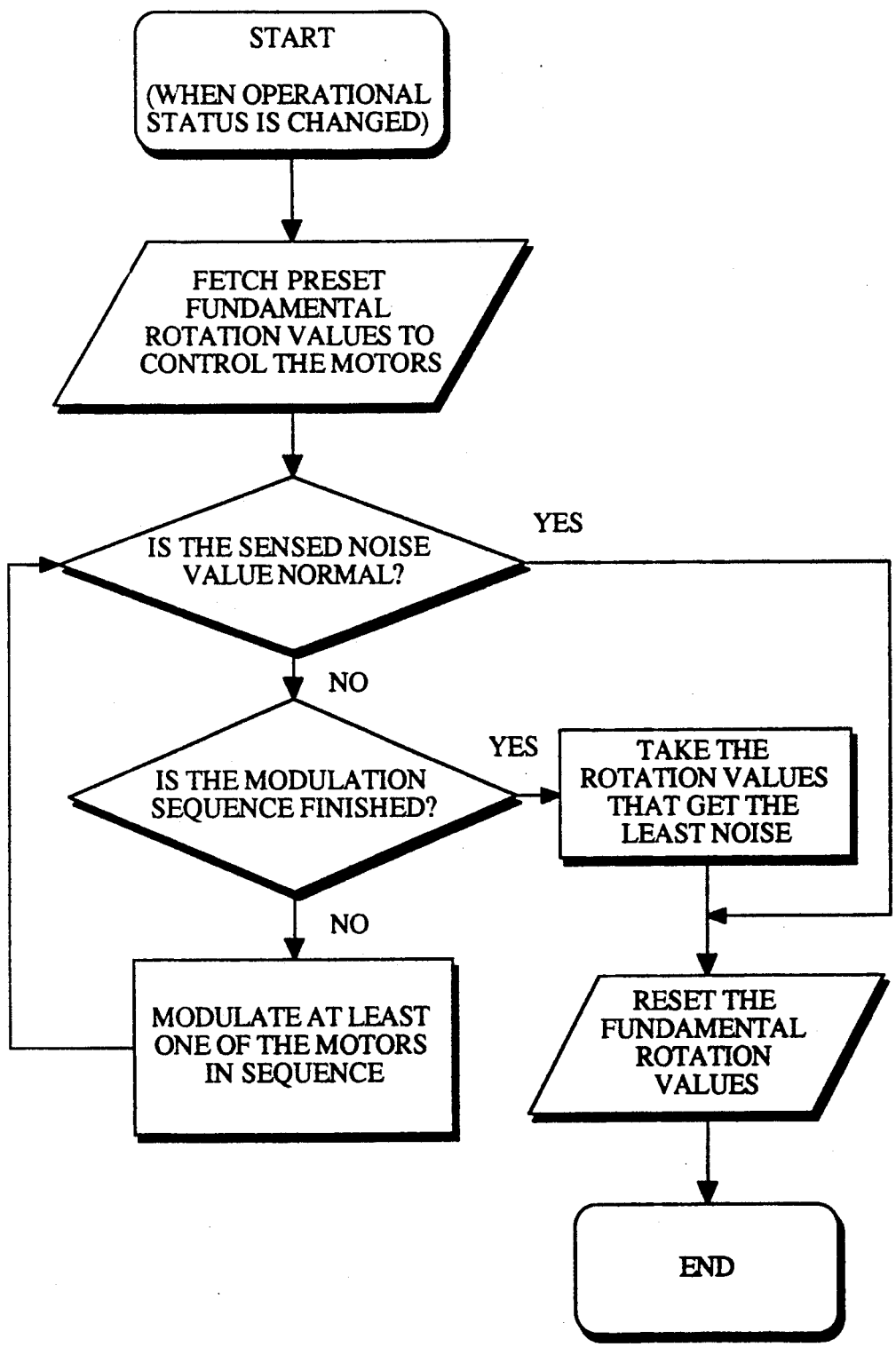
FIG. 2 is a flow chart illustrating the test and modulation of the speed of the motors while the air conditioner according to this invention is at work.

FIG. 2 is a flow chart showing the test and modulation of rotation speed of each motor while the air conditioner is at work. When the air conditioner starts to rotate or the power at work needs to change (such as to increase the output of cold air or to accelerate the condensation, typically based on the user's demand and the operation/control process of the air conditioner itself), the microcomputer 16 fetches the preset rotation value for each motor stored in the memory to control the rotational speed of each motor based on the value, and monitors the sensed value of the vibration/noise detector 15. When the value is beyond the preset one, the microcomputer 16 will try to modulate the rotational speed of one or more than one motor till the vibration and noise become normal or reach a minimum value. The rotational speed of the motor A, B, or C is modulated step-by-step within a preset adjustable range corresponding to a fundamental rotational speed. The modulation sequence can be: first, try to modulate one of the motors; if not, try two of them at the same time (motors A and B, B and C, or C and A); if not again, try all of them, till the sensed noise value is getting to be normal or reach the minimum; then, reset the fundamental rotational speed value with the updated speed.

Figure 3:
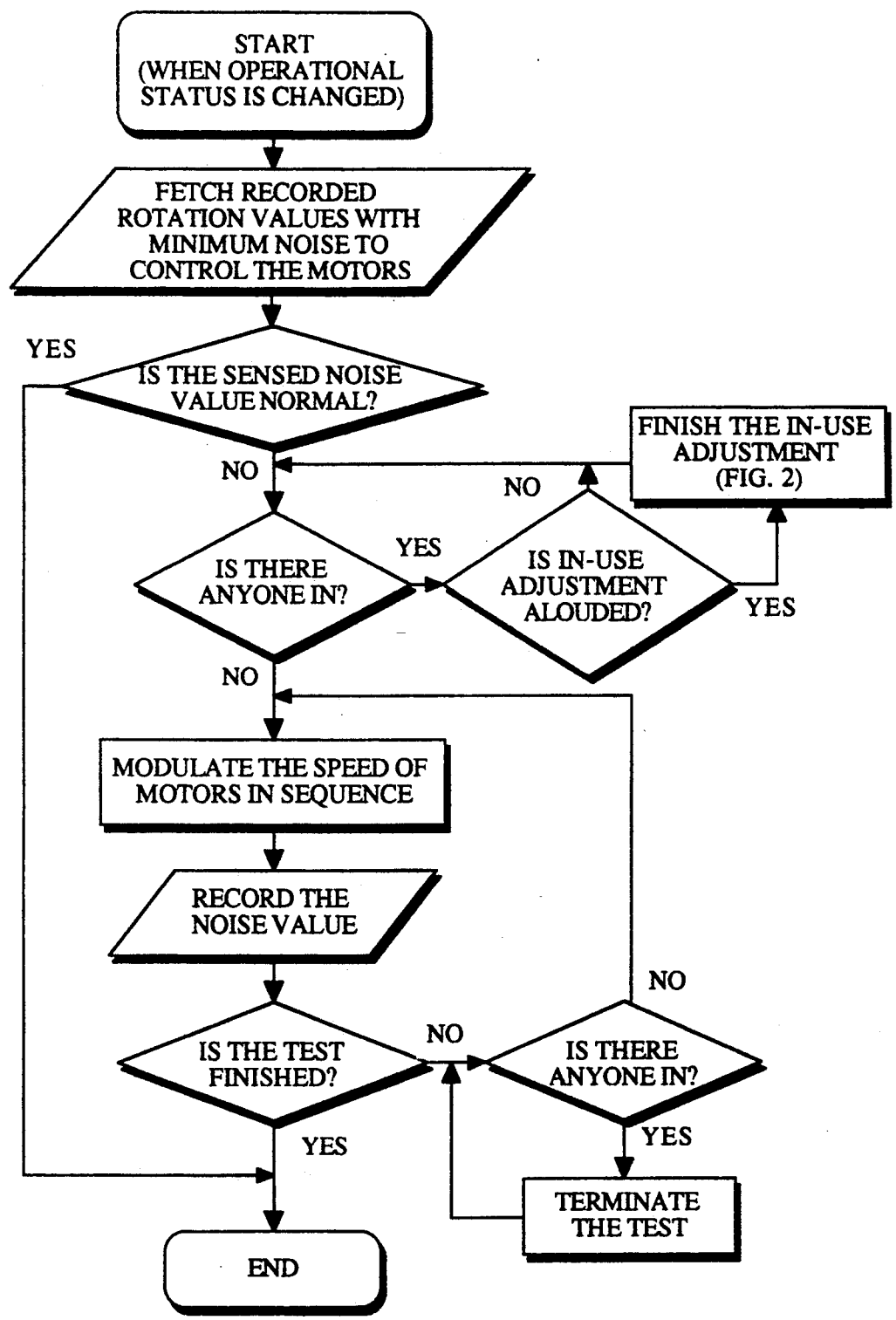
FIG. 3 is a flow chart illustrating how the test is recorded executed and the resulting while no one is in a vicinity of the air conditioner, whereby the test values can be utilized directly while the air conditioner is in use.

FIG. 3 is a flow chart showing how to self-test and record all relationships of rotational speed of each motor and the noise. The optimum values can be retrieved directly as the air conditioner starts to work. Usually when an air conditioner is installed, the self-test is automatically performed, based on the new system of the air conditioner and the environment, of the installation to build up a table of values of generated noise and vibration and corresponding rotational speeds of the motors and store them in the microcomputer 16. As a result, when the air conditioner is installed and starts to rotate or the power at work needs to change (a change of operating state or status) the microcomputer 16 will retrieve the values of optimum rotational speed for each motor with minimum noise in a corresponding rotational speed region (range) and control each motor based on them. The microcomputer 16 will then check if the sensed value of the vibration/noise detection 15 is under the anticipated value, stored optional valve and if not, it will start an overall test and record the outcome after the human body detector 19 senses that no one is in the room. (Or, when someone is in, it can also perform the test and make it adjustment according to the user's instruction or when the vibration is too noisy). The overall test means to adjust and organize the rotational speed of each motor within each adjustable region and record each vibration/noise value respectively till all combinations of motor speed have been tested. However, when the body detector 19 senses that someone is entering the room, the test will be discontinued automatically and restore the air conditioner to its original on or off status till no one is in and the test will continue. When the air conditioner is next in use, it will avoid a large vibration and noise based on the updated table of values of vibration and noise of and rotational speed for each motor stored in the memory, and operate at an optimal rotational speed with minimum vibration and noise.

This invention not only reduces vibration and noise of an air conditioner, but also enables the motors to keep in a stable status and rotate more effectively which prolongs the life of the machine and saves energy as well. Especially when an air conditioner has been used for a long time, it will become noisy as the machine become worn, soiled, rusted, etc.. As a result, this invention will automatically extend the life of the air conditioner.

The above mentioned embodiment is described based on a structure of an air conditioner with three motors. In practice, it can be applied to any air conditioning apparatus or machine (air conditioner, cooler/heater, dehumidifier, central air conditioning system, freezing system, drying system, etc.) equipped with any number of motors. They are included in the extent of the appended claims.

What is claimed is:

1. In an air conditioning apparatus having a condenser fan, an evaporator fan, a compressor, and at least two motors for driving the fans and the compressor, the improvement comprising means, responsive to vibration of the apparatus, for controlling a speed of each of said motors to reduce the vibration; wherein said controlling means performs a test to determine optimum speeds of said motors to minimize the vibration, said controlling means including
   a microcomputer means operative during the test to change the speed of at least one of said motors to each of a plurality of speed values within a predetermined speed range, and
   at least one detector for detecting values of the vibration, said controlling means controlling said at least one of said motors, at a termination of the test, to operate at a speed value at which the vibration is minimized.

2. An apparatus according to claim 1, wherein said microcomputer means terminates the test and controls the motors to operate at respective most recent speed values at which the motors have been operated, if the detected vibration at the most recent speed values is not greater than a predetermined normal vibration value.

3. An apparatus according to claim 2, wherein the apparatus is operable in any one of a plurality of states, each state being defined by corresponding ranges of speed of the motors, said microcomputer means storing for each state a normal vibration value and respective optimum speeds of the motors, said microcomputer means being responsive to a requested change in the state of the apparatus to perform said test, with speed values of the motors in the respective speed ranges defined by the requested state, until the earlier of (1) detection of the vibration to be not greater than the normal vibration value for the requested state and (2) completion of the test at each of the plurality of motor speeds in the respective speed ranges corresponding to the requested state, wherein if the test is completed before a vibration not greater than the normal vibration value is detected, the tested speed values producing the lowest vibration are substituted as the stored optimum speeds for the requested state.

4. An apparatus according to claim 3, wherein said microcomputer means performs the test in such a manner that the vibration values are first detected while each motor, except one, operates at the stored optimum speed corresponding thereto and the speed of the one motor is modulated while the vibration is detected, and if a vibration less than the normal vibration value is not detected, then the speed of each of two motors is modulated while the vibration is detected.

5. An apparatus according to claim 1, wherein said at least one detector is an infrared sensor.

6. An apparatus according to claim 1, wherein said controlling means further includes a human body detector for continuously detecting whether a human body is in a vicinity of the apparatus, said microcomputer means being responsive during the test to a detection of a human body to discontinue the test until a human body is no longer detected.

7. An air conditioning machine, comprising at least two motors for actuating a condenser fan, an evaporator fan and a compressor, and means for controlling and modulating the rotational speed of each motor to enable the respective rotational speeds of the motors to be adjusted to an optimum status which eliminates resonant vibration and reduces noise when the machine operates in its environment, said means including a microcomputer and at least a detector for detecting vibration and noise values of the machine, searching for an optimum status for all said motors wherein said machine operates with minimum vibration and noise and controlling said motors to their required rotational speeds.

8. A machine according to claim 7, wherein said microcomputer controls each motor by the following steps:
(1) When an operational status of said machine is requested to be changed, said microcomputer fetches corresponding fundamental rotational values for each motor and controls each motor's rotational speed based on said values; and
(2) When said detected vibration and noise value is beyond a preset value, said microcomputer starts to modulate the rotational speed of one or more than one of the motors till said detected value is close to said preset value or a minimum vibration and noise value.

9. A machine according to claim 8 wherein the rotational speed of each motor is modulated step by step within a preset adjustable range corresponding to said fundamental rotational value.

10. A machine according to claim 8 wherein the modulation for said motors is in the following sequence: first, to try to modulate the rotational speed of one of said motors; if not, try two of them; and so forth till all motors are modulated at the same time.

11. A machine according to claim 7 further comprises a human body detector for sensing if there is anybody in its environment and outputting corresponding signals to said microcomputer.

12. A machine according to claim 11 wherein said microcomputer controls said motors by the following steps:
(1) When the operational status of said machine is requested to change, said microcomputer controls the rotational speed of each said motor by retrieving corresponding rotational values for each motor with minimum noise;
(2) When the detected value of said vibration and noise detector is beyond an anticipated region, and said human body detector senses that nobody is in a vicinity of the machine, said microcomputer starts an overall test which enables said motors to orderly modulate their rotational speed within their adjustable regions and record the values of vibration and noise simultaneously till all the modulation is done; during the testing, when said human body detector senses that someone is in said vicinity, said microcomputer discontinues the test and restores the machine to the original operating status; and will continue the test when nobody is in said vicinity; and
(3) When the machine is in use and said motor need to change their rotational speed, said microcomputer avoids selections of motor rotational speeds with loud noise and controls rotational speed of said motors with minimum vibration and noise based on said recorded values of vibration and noise.

* * * * *